United States Patent [19]
Conley et al.

[11] Patent Number: 5,586,749
[45] Date of Patent: Dec. 24, 1996

[54] COMPOSITE POLYETHYLENE AND TRANSITION VALVE

[75] Inventors: Richard W. Conley, Oakmont; Robert G. Visalli, Murrysville; James R. Daniels, McDonald, all of Pa.

[73] Assignee: Kerotest Manufacturing Corp., Pittsburgh, Pa.

[21] Appl. No.: 261,719

[22] Filed: Jun. 17, 1994

[51] Int. Cl.⁶ ........................................ F16K 5/06
[52] U.S. Cl. ......................... 251/315.05; 251/315.15; 251/148
[58] Field of Search .................... 251/315.15, 148, 251/315.05; 285/238, 239, 256, 382

[56] References Cited

U.S. PATENT DOCUMENTS

| | | | |
|---|---|---|---|
| 2,933,428 | 4/1960 | Mueller | 154/116 |
| 2,967,067 | 1/1961 | Singer | 285/238 |
| 3,025,086 | 3/1962 | Mosely | 285/250 |
| 3,245,701 | 4/1966 | Leopold, Jr. et al. | 285/239 X |
| 3,287,802 | 11/1966 | Robinson | 29/508 |
| 3,524,661 | 8/1970 | Farnam | 285/239 |
| 3,612,584 | 10/1971 | Taylor et al. | 285/174 |
| 3,656,711 | 4/1972 | Toelke | 251/151 |
| 3,857,546 | 12/1974 | Quirk | 251/315.15 |
| 3,915,480 | 10/1975 | Kish et al. | 285/174 |
| 3,990,675 | 11/1976 | Bonafous | 251/148 |
| 4,005,880 | 2/1977 | Anderson et al. | 285/47 |
| 4,094,537 | 6/1978 | Lyall | 285/47 |
| 4,466,640 | 9/1984 | Van Houtte | 285/104 |
| 4,478,388 | 10/1984 | George | 251/309 |
| 4,482,170 | 11/1984 | Jacobson et al. | 285/55 |
| 4,523,740 | 6/1985 | Paitchell | 251/315 |
| 4,553,562 | 11/1985 | Nakada | 137/375 |
| 4,589,688 | 5/1986 | Johnson | 285/12 |
| 4,665,937 | 5/1987 | Hall | 137/15 |
| 4,682,797 | 7/1987 | Hildner | 285/40 |
| 4,712,809 | 12/1987 | Legris | 285/21 |
| 4,793,638 | 12/1988 | Baldwin, Jr. | 285/174 |
| 4,997,214 | 3/1991 | Reese | 285/174 |
| 5,265,652 | 11/1993 | Brunella | 141/59 |
| 5,396,922 | 3/1995 | Ottens | 251/315.15 X |

OTHER PUBLICATIONS

"Dresser® 700 Universal Posi–Hold® Couplings"–Dresser Manufacturing Division, Dresser Industries Inc., Bradford, Pennsylvania 16701, Form 782–700.

"Dresser® 700 Posi–Hold® Couplings and Fittings", Dresser Manufacturing Division, Dresser Industries Inc., Bradford, Pennsylvania 16701, Form 700–185 Rev. 386.

"Dresser Couplings and Fittings for Joining Steel to Polyethylene Pipe or Tubing (SP) or Polyethylene to Polyethylene Pipe Tubing (PP)", Dresser Manufacturing Division, Dresser Industries Inc., Bradford, Pennsylvania 16701, Form 278–G.

"Double O Seal Transition Fittings", Central Plastics Company, Box 3129, Shawnee, Oklahoma 74801, 1984.

"The Lyco® Transition Fitting System", R. W. Lyall & Company, Inc., 9837 Pioneer Boulevard, Santa Fe Springs, CA 90670.

"Kerotest Weldball® Gas Distribution Valves", Kerotest Manufacturing Corp., 2525 Liberty Avenue, Pittsburgh, PA 15222, 1989.

*Primary Examiner*—John C. Fox
*Attorney, Agent, or Firm*—Price & Adams

[57] ABSTRACT

A valve body pressure formed from pipe components includes an annular portion for receiving a ball closure member. A pair of conduit portions are connected to the annular portion and the ball. A stem housing for rotatably supporting a valve stem extends up from the annular portion. The stem housing, annular portion, and conduit portions are welded to form the unitary valve body. The conduit portions are integrally connected to end fittings adaptable to connect identical or different grades of polyethylene pipe or metal pipe to polyethylene pipe. The internal surface of the conduit portion includes gripping teeth and O-ring seals that frictionally and sealingly engage the surface of the polyethylene end fitting. The valve can include a metal end fitting and a polyethylene end fitting. The polyethylene end fitting is connected by butt fusion or electrofusion coupling to polyethylene conduit, generally 6 inches in diameter or larger for use in a natural gas distribution system. The metal valve body is wrapped with a fiberglass winding coated with epoxy for corrosion resistance and electrical isolation.

11 Claims, 2 Drawing Sheets

5,586,749

COMPOSITE POLYETHYLENE AND TRANSITION VALVE

BACKGROUND OF THE INVENTION

1. Field of the Invention

This invention relates to a polyethylene valve and a transition valve having at least one integral metal to polyethylene end fitting and more particularly to a metal ball valve pressure formed from pipe and having at least one end fitting adaptable for direct connection to polyethylene pipe.

2. Description of the Prior Art

Prior to the development of polyethylene pipe, it was the conventional practice to utilize metal valves connected to iron and steel pipes for the underground conveyance of pressurized fluids and gases. The metal composition of the valves and pipes required that they be treated to resist corrosion and deterioration due to cathodic action. To provide corrosion resistance and cathodic protection, the metal pipes and valves are coated with insulative material.

Metal ball valves specifically used in underground distribution systems are susceptible to corrosion. Therefore, they must be installed in a manner to permit periodic visual inspection.

The requirement to protect underground metal valves and pipes from corrosion and facilitate their visual inspection substantially adds to the installation and maintenance costs of underground metal distribution systems. Notwithstanding these factors, metal gate and ball valves are extensively used in natural gas, fuel oil and industrial piping systems because of their effective sealing capabilities and reliable performance at high pressure and temperature. U.S. Pat. No. 4,665,937 is an example of a known metal ball valve suitable for these uses.

More recently with the development of polyethylene conduit, iron and steel underground conduit has been replaced with polyethylene conduit. Polyethylene conduit is substantially lighter than metal conduit, corrosion resistant and less expensive. As underground metal conduit is required to be repaired in its maintenance cycle, polyethylene conduit is being installed in its place. Because polyethylene conduit is exempt from periodic visual inspections, it is particularly suited for use in buried natural gas distribution.

Not only are iron and steel underground conduits being replaced with polyethylene conduits, metal ball and plug valves are being replaced by equivalent valves fabricated of polyethylene. Examples of polyethylene control valves are disclosed in U.S. Pat. Nos. 3,656,711; 4,523,740; and 4,553,562. The ends of polyethylene valves are conventionally connected to polyethylene conduit by butt fusion or by electrofusion coupling.

Valves fabricated of thermoplastic material are composed of parts which are injection molded. Because of the size and expense of injection molding equipment, it has not been feasible to fabricate polyethylene ball valves having end connections greater than 4 inches without a severe reduction in internal size and flow capacity. This substantially limits the use of thermoplastic valves in natural gas distribution systems where it is preferred to use conduit having a diameter of 6 inches and larger.

Polyethylene conduit is limited in use by its pressure rating as is the polyethylene valve connected to polyethylene conduit. For example, a polyethylene ball valve connected to 4 inch diameter polyethylene conduit is limited to 100 psi for natural gas distribution. In order to use polyethylene conduit having a pressure rating greater than 100 psi, higher pressure rated polyethylene valves are required. Presently polyethylene valves of this type are not commercially available.

Thermoplastic valves rated, for example, to 275 psi are not commercially feasible because of their expense of manufacture. This is partly due to the substantial capital costs required for the injection molding equipment needed to fabricate high pressure polyethylene valves, especially for conduit 6 inches in diameter and larger. In addition, as the size and pressure rating of a thermoplastic valve increases, the difficulty in operation and sealing of the valve increases.

For a larger diameter conduit, i.e. above 4 inches, the fluid pressure on the valve body and valve closure member increases. The thermoplastic material comprising the valve body and closure member has a tendency to creep or migrate when subjected to high pressure. Creeping of the polyethylene valve body from the valve closure element can produce a gap around the closure member resulting in leakage of the valve in a closed position. In order to overcome the problem of creep or migration of the thermoplastic material in the valve at high pressure, the molded parts of the valve, including the valve seat and closure member, must be reinforced. This adds to the cost of manufacturing a polyethylene ball valve.

In view of the limitations in the use of polyethylene ball valves in conduit systems above 4 inches in diameter attempts have been made to combine metal ball and plug valves with polyethylene conduit. The combination of a metal valve and polyethylene conduit permits the practical use of larger sized polyethylene conduit and the performance capabilities of a metal valve.

One of the problems encountered in combining metal valves and polyethylene conduit is coupling the members to form a fluid tight seal. The metal pipe ends must be sealingly engaged to the polyethylene pipe. A conventional metal ball valve is formed of components which are cast and mechanically connected by nuts and bolts. The valve ends must also be mechanically coupled to the ends of the polyethylene pipe.

Many embodiments have been proposed for the compression fitting of metal conduit to polyethylene conduit. Examples of transition fittings between metal and polyethylene conduits are disclosed in U.S. Pat. Nos. 2,933,428; 3,025,086; 4,005,880; 4,682,797; 4,712,809; 4,997,214; and 5,265,652.

While the use of a steel foundation for metal ball valve eliminates many of the problems inherent with polyethylene valves, the transition between the metal and polyethylene must be effectively sealed. The above patents disclose a number of approaches to sealing the conduit ends. For larger sized conduits, the complexity and expense of the couplings increases. A fluid tight seal can be achieved, but the transition requires a number of fastening components. Accordingly, as the number of components increases, the problems of maintaining an effective seal between the components becomes more difficult. These concerns necessitate periodic visual inspection of the underground system and the metal valve must be continually monitored for the effects of corrosion.

While it has been proposed to combine metal ball and plug valves with polyethylene conduit above 6 inches in diameter for use in natural gas distribution systems, the known couplings are expensive, bulky, and difficult to install. When combined with a metal valve, periodic visual inspection of the system is required. Therefore, there is need in underground fluid distribution systems for a metal valve that is efficiently connected to both metal and polyethylene conduit or to a combination of both polyethylene and metal conduit to form a fluid tight seal at the transition and is substantially maintenance free.

SUMMARY OF THE INVENTION

In accordance with the present invention, there is provided a valve assembly that includes a metal valve body having an annular portion, a pair of conduit portions and a stem portion. Means is provided for connecting the conduit portions and the stem housing to the annular portion to form a unitary structure free of fastening elements. The annular portion forms a valve chamber. The conduit portions include passageways positioned in spaced relation in the annular portion to provide a flow path between the conduit portions through the valve chamber. A valve closure member is positioned in the valve chamber and is sealingly connected to the conduit portions for rotation between an open position for directing flow between the conduit positions and a closed position sealing the conduit portions against flow. A valve stem extends from the closure member through the annular portion and is rotatably positioned within the stem housing. An actuator is connected to the valve stem above the stem housing for turning the valve stem to move the closure member between the open and closed positions. A pair of end fittings extend outwardly from the conduit portions with at least one of the end fittings being fabricated of polyethylene for direct connection to polyethylene conduit. Means is provided for integrally connecting the end fittings to the conduit portions to form a unitary valve assembly having at least one polyethylene end fitting integral with the metal valve body.

Further in accordance with the present invention, there is provided a method for assembling a valve comprising the steps of positioning a closure member within a fluid chamber of an annular body portion. The closure member is connected to a valve stem extending upwardly through the annular body portion. Conduit portions extend in opposed spaced relation to the annular body portion into the chamber. The conduit portions are sealingly connected to the closure member for rotation of the closure member between an open position directing fluid flow between the conduit portions through the closure member and a closed position interrupting fluid flow between the conduit portions. A stem housing surrounding the valve stem is welded to annular body portion. The conduit portions are welded to the annular body portion to form a unitary assembly of the annular body portion with the stem housing and the conduit portions. End fittings extend from the conduit portions externally of the annular body portion with at least one of the fittings being fabricated of polyethylene. The polyethylene end fitting is secured in gripping engagement with one of the conduit portions to provide a unitary metal valve body having an end fitting for direct connection to polyethylene conduit.

Additionally the present invention is directed to a polyethylene valve having a metal body portion including an annular portion integrally connected free of fasteners to a pair of conduit portions. The conduit portions extend from opposite sides of the annular portion. The conduit portions have passageways extending therethrough and open into the annular portion. A pair of end fittings fabricated of polyethylene extend outwardly from the conduit portions. Means is provided for securing in gripping engagement the polyethylene end fittings to resist pull-out of the end fittings from the conduit portions to provide the unitary metal body portion with integral polyethylene end fittings.

Accordingly, a principal object of the present invention is to provide a metal valve having a unitary body portion assembled free of fasteners and provided with at least one integral polyethylene end portion.

Another object of the present invention is to provide a composite polyethylene and metal valve having a unitary metal body portion integrally connected to a pair of polyethylene end fittings for direct connection to polyethylene conduit.

An additional object of the present invention is to provide a transition valve having a compact unitary body portion with polyethylene and metal end fittings for connecting polyethylene and metal conduit.

A further object of the present invention is to provide a transition valve having a unitary metal body portion with selected end fittings for connecting plastic and metal conduit by a single valve or plastic conduit of dissimilar characteristics.

Another object of the present invention is to provide a composite polyethylene valve having an integral metal body and polyethylene end portions for direct connection to polyethylene conduit free of fasteners and protected by an insulative coating for corrosion resistance to facilitate inspection free maintenance of the valve in an underground distribution system.

Another object of the present invention is to provide a method for connecting conduit of dissimilar material by a transition valve having a metal body portion with end portions for receiving conduit fabricated of metal and different grades of polyethylene without the need for complex couplings or fasteners.

These and other objects of the present invention will be more completely disclosed and described in the following specification, the accompanying drawings and the appended claims.

DESCRIPTION OF THE PREFERRED EMBODIMENTS

Figure 1:
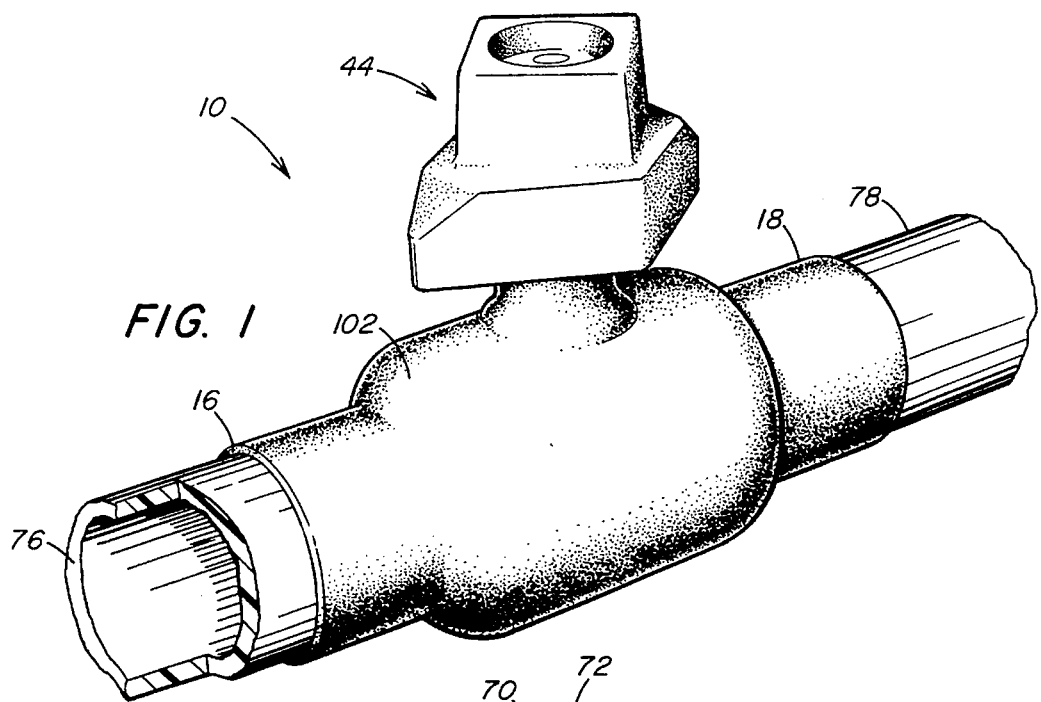
FIG. 1 is an isometric view of a metal ball valve encapsulated in a fiberglass-bonded material with integral polyethylene end fittings.
Figure 2:
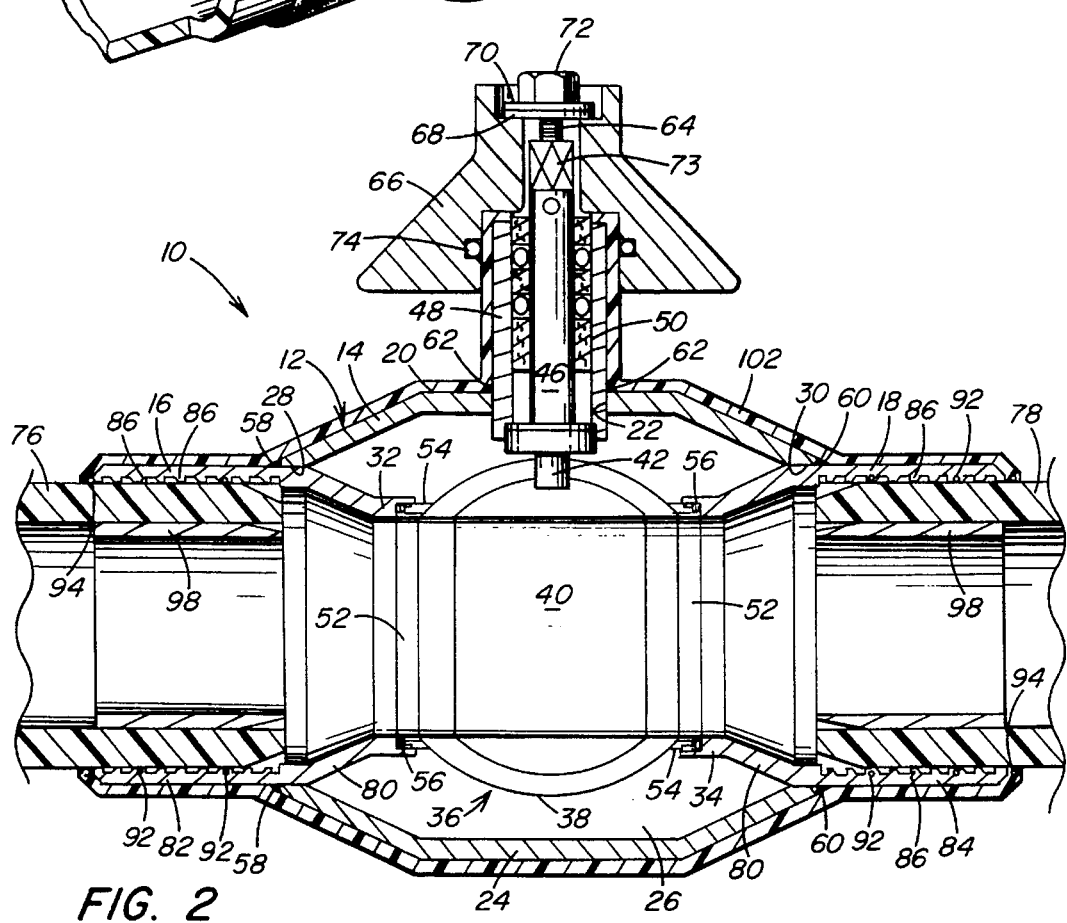
FIG. 2 is a fragmentary, sectional view in side elevation of the metal valve shown in FIG. 1, illustrating a pair of polyethylene end fittings formed integral with the valve body.

Referring to the drawings and particularly to FIGS. 1 and 2, there is illustrated a composite transition valve for connecting conduit of selected material generally designated by the numeral 10 adaptable for use as a distribution valve to control the conveyance of fluid, either liquid or gas, through a piping system.

The valve 10 of the present invention is particularly adapted for underground use in controlling natural gas distribution. As shown in FIG. 2, the valve 10 includes a valve body generally designated by the numeral 12 having a central annular portion 14 and a pair of conduit portions 16 and 18 extending from opposite sides of the annular portion 14. The annular portion 14 has an upper surface 20 with an opening 22 therethrough and a sealed lower surface 24 to form a fluid chamber 26. The chamber 26 has oppositely positioned openings 28 and 30 through which extend the conduit portions 16 and 18 of the valve body 12.

The conduit portions 16 and 18 have end portions 32 and 34 respectively that extend into the chamber 26 and are positioned in spaced relation for connection to a valve closure member generally designated by the numeral 36. Preferably, the closure member 36 is in the form of a ball or sphere 38 fabricated of stainless steel having a transverse passageway 40 that is movable into and out of alignment with the passageways through the conduit portions 16 and 18.

The ball 38 is rotated 90° to effect opening and closing of the valve 10. The valve 10 is shown in an open position in FIGS. 1 and 2 to permit flow between the conduit portions 16 and 18 through the passageway 40 of the ball 38. It should be understood that other types of closure members, such as plugs or butterflies, can be used in a composite valve in accordance with the present invention.

The ball closure member 36 is connected to a valve actuator generally designated by the numeral 44. The valve actuator 44 includes an operating stem 46 rotatably positioned within a stem housing 48. A wire reinforced packing ring 50 sealing surrounds the operating stem 46 within the stem housing 48. An integral pin 42 extending from the lower end of the operating stem 46 is connected to the ball 38. Rotation of the stem 46 rotates the ball 38 into and out of a closed position with respect to the conduit portions 16 and 18.

The components of the valve body 12 including the annular portion 14, the conduit portions 16 and 18, and the stem housing 48 are tubular members which are welded together to form the unitary valve body 12. The annular portion 14 and the conduit portions 16 and 18 are pressure formed from pipe and are not formed by casting. By pressure forming the annular portion 14 and conduit portions 16 and 18 from pipe, the cost of fabrication of the composite transition valve 10 is substantially reduced in comparison with fabricating the components by casting.

In assembling the composite transition valve 10 of the present invention, the operating stem 46 is initially inserted through either opening 28 or 30 into the annular portion 14. The operating stem 46 is extended upwardly through the opening 22 into the stem housing 48 until the shoulder on the stem end portion is positioned in abutting relation with the lower end of the stem housing 48. This arrangement also prevents blow-out of the valve stem 46 from the valve body 12. The ball member 38 is then inserted in the annular portion 14 and connected to the stem pin 42. Annular seals 52 are positioned between the openings into the conduit portions 16 and 18 and the surface of the ball 38 to form a fluid tight seal therebetween.

The end portions 32 and 34 of the conduit portions 16 and 18 include annular recesses that receive valve seats 54 that extend from opposite ends of the ball member 38. Positioned between the valve seats 54 and the ends of the conduit portions 16 and 18 within the recesses are springs 56 that exert a biasing force upon the ball 38. This arrangement maintains a fluid tight seal between the ball 38 and the conduit portions 16 and 18 when the valve 10 is closed.

Once the valve actuator 44 is connected to the ball 38 and the ball mounted in sealing relation with the conduit portions 16 and 18, the valve body annular portion 14 is connected by welding to the conduit portions 16 and 18. The conduit portions 16 and 18 are connected to the annular portion 14 by weldments 58 and 60. The annular portion 14 is also connected by welding to the stem housing 48. A weldment 62 is formed between the stem housing 48 and the valve body annular portion 14. The annular portion 14, the conduit portions 16 and 18, and the stem housing 48 form a unitary structure which is compact in design and free of conventional fasteners.

The operating stem 46 extends upwardly through the stem housing 48 and includes a threaded stud 64 that receives an actuator top 66. The top 66 extends downwardly in surrounding relation with the upper portion of the operating stem 46 and the stem housing 48. A rubber gasket-type weather seal 68 and a washer 70 are positioned on the stud 64 within a recessed portion of the actuator top 66. A stem nut 72 is threadedly advanced on the stud 64 to compress the washer 70 and the gasket 68 into engagement with the actuator top 66. Flat planar surfaces 73 on the operating stem 46 nonrotatably engage the flat surfaces within the bore of the actuator top 66.

With the above arrangement rotation of the top 66 is transmitted to the stem 46 to rotate the ball member 38 through 90° between open and closed positions of the valve 10. The actuator top 66 also retains an O-ring weather seal 74 in surrounding relation with the top of the valve body annular portion 14 that surrounds the stem housing 48. The weather seal 74 prevents moisture and foreign matter from entering the valve body 12 through the stem housing 48.

Figure 4:
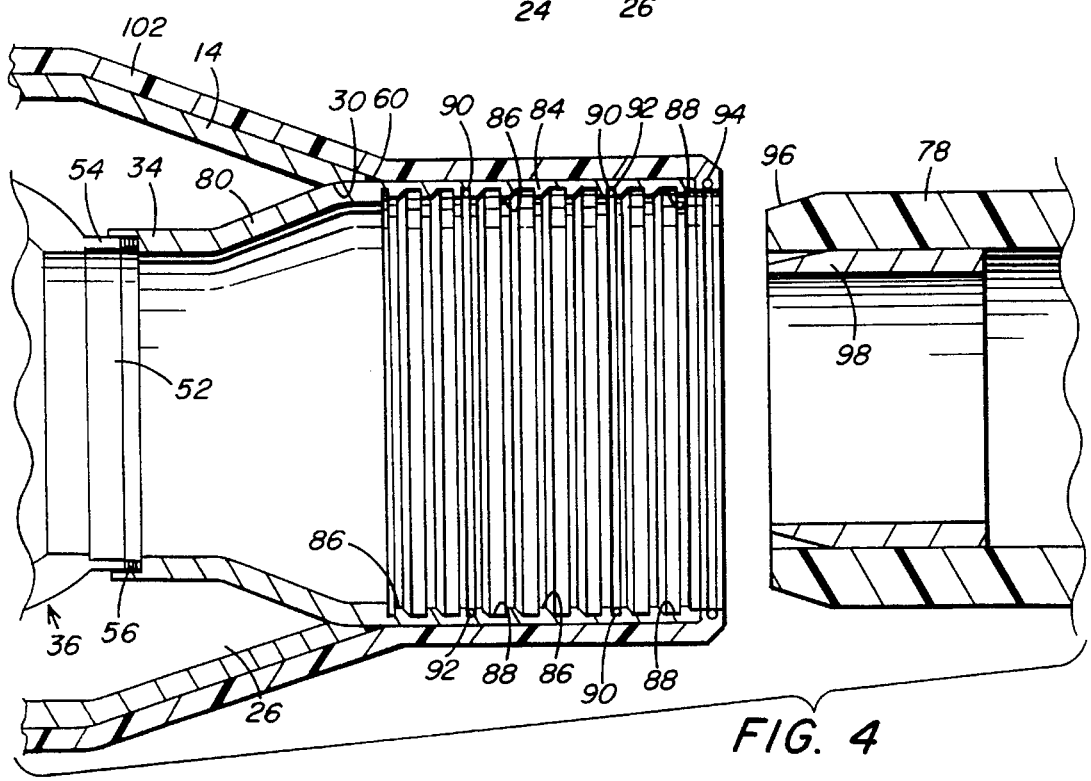
FIG. 4 is an enlarged exploded view in section of the connection of the polyethylene end fitting to the metal valve body, illustrating a valve conduit portion having an internal surface for gripping the external surface of the polyethylene end fitting.

Now referring to FIGS. 2 and 4, there is illustrated in detail the connection of the valve body conduit portions 16 and 18 to a pair of end fittings 76 and 78 of the composite transition valve 10. The end fittings 76 and 78 are fabricated of polyethylene material to facilitate their direct fusion to polyethylene conduit (not shown) either by butt fusion or with electrofusion coupling.

The metal valve body 12 can be constructed of a size to accommodate polyethylene conduit of a preselected diameter, for example, conduit having a diameter of 6 inches and larger. The plastic end fittings 76 and 78, as shown in FIG. 2, are integrally formed with the valve body 12 by gripping engagement with the metal conduit portions 16 and 18. As seen in detail in FIG. 4, each conduit portion 16, 18 includes a reduced end section 32, 34 connected as above-described to the ball member 38. The conduit portion includes a frustoconical section 80 that radially expands to a cylindrical end section 82, 84. The cylindrical section 82, 84 includes an internal gripping surface formed by a plurality of spaced apart metal teeth or protrusions 86 forming grooves 88 therebetween. At selected positions along the length of the cylindrical section 82, 84 there are provided O-ring grooves 90 for receiving O-rings 92.

The polyethylene end fittings 76 and 78 have an external diameter corresponding to the internal diameter of the conduit cylindrical sections 82 and 84 to form an interference fit therewith. Preferably, to facilitate insertion of the end fittings 76 and 78 into the conduit cylindrical sections 82 and 84, each fitting is provided with a tapered end portion 96. A lock ring 98 is positioned within each end fitting for reinforcement and extends to the tapered end portion 96.

The tapered end portion 96 facilitates the insertion of the polyethylene end fittings 76 and 78 into the metal conduit portions 16 and 18. Because of the interference fit between the end fitting 76, 78 and the internal gripping teeth 86, the end fitting is compressed into frictional engagement with the conduit portion 16, 18. The end fitting 76, 78 is advanced into the conduit portion 16, 18 until the tapered end portion 96 abuts the interior frustoconical section 80. In this position, the polyethylene end fitting 76, 78 is connected to the metal conduit portion and becomes an integral part of the valve body 12. This is accomplished without complicated fasteners and couplings conventionally used in a composite polyethylene and metal valve.

By providing the composite valve 10, as shown in FIG. 2, with the integral polyethylene end fittings 76 and 78, the valve 10 can be used to connect selected polyethylene conduit of a specific diameter. For example, with a 6 inch diameter valve 10 identical grades of polyethylene pipe can be connected to each other as well as dissimilar grades of pipe. In one application, high density polyethylene pipe of identical diameter and pipe thickness can be connected. In another application, high density polyethylene pipe can be connected by the valve 10 to medium density polyethylene pipe. The thickness of the pipe may also be different with the same diameters. Thus, the valve 10 is a versatile polyethylene valve capable of connecting many different types of conduit.

Figure 3:
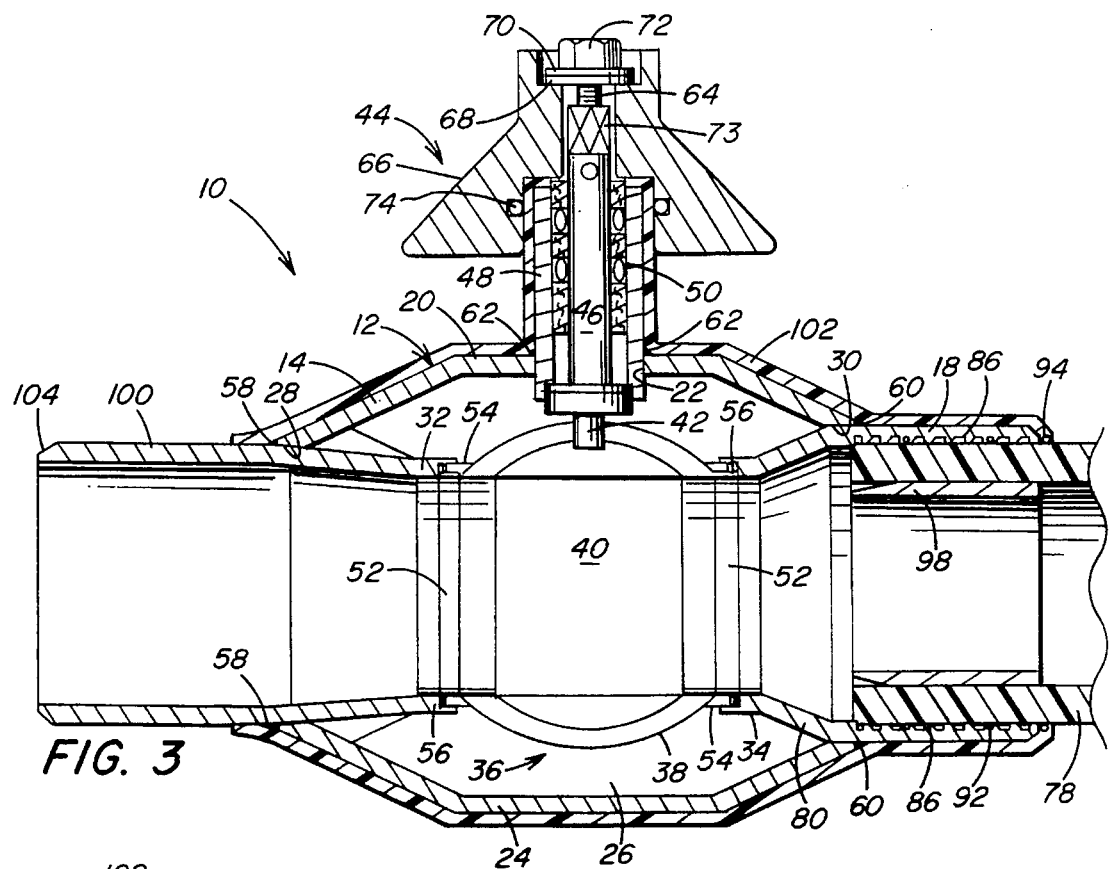
FIG. 3 is a view similar to FIG. 2, illustrating the metal valve having a metal end fitting and a polyethylene end fitting.

The valve 10 also operates as a transition valve, as shown in FIG. 3, to connect metal conduit and polyethylene conduit. In this embodiment, the transition valve 10 includes the conduit portion 18 for receiving the polyethylene end fitting 78 adapted for direct connection to polyethylene conduit and a unitary conduit portion and end fitting 100 adapted for connection to metal conduit. The end fitting 100 includes an end shoulder 104 that is butt welded to the metal conduit. This arrangement provides a metal end fitting 100 and a polyethylene end fitting 78 in a single valve. The transition from metal conduit to polyethylene conduit is made without complex couplings and fasteners. Also, the structure of the valve permits a versatile range of metal and polyethylene conduit to be connected to one another by a single valve.

To protect the metal valve body portion 10 from corrosion, it is encapsulated by a fiberglass coating 102. As shown in FIG. 2 for the embodiment of the polyethylene valve, the fiberglass coating 102 is formed by a fiberglass winding that is wrapped around the stem housing 48, the valve body annular portion 14, and the metal conduit portions 16 and 18. For the embodiment of the transition valve shown in FIG. 3, the winding 102 may extend onto a portion of the metal end fitting 100. Preferably, the fiberglass coating 102 includes an epoxy resin mixed with the fiberglass to enhance bonding of the fiberglass coating 102 to the valve body and the end fittings, either metal or polyethylene.

To provide a moisture seal around the end fittings 76 and 78, the fiberglass coating 102 is provided with an annular recess for receiving an O-ring 94 at the extreme end of the conduit portion 16 and 18, as shown in FIGS. 2 and 4. The recess for the O-ring 94 in the fiberglass is formed by a mandrel. Once the end fittings 76 and 78 are inserted in the conduit portions 16 and 18 the O-rings 94 are advanced over the end fittings 76 and 78 into the grooves of the coating 102. In this manner the O-ring 94 serves as a weather seal to prevent moisture and foreign matter from entering the valve around the end fittings. Thus, the fiberglass coating 102 provides the valve 10 with corrosion resistance and electrical isolation.

With the composite polyethylene and transition valve 10 of the present invention, a compact and easily assembled ball valve is adapted for connection to polyethylene conduit, particularly polyethylene conduit 6 inches and larger and having similar, as well as, dissimilar features such as density and thickness. The valve 10 for a metal to polyethylene transition permits use of larger polyethylene conduit with ball valves which were not heretofore available for polyethylene ball valves. The composite transition valve 10 permits the direct connection of polyethylene conduit to metal conduit by a single valve, eliminating the need for a valve and two separate transition fittings. By fabricating the valve body 12 from pipe components welded to form an integral structure, the complex connections conventionally required for a cast metal ball valve are also eliminated. The integral end fittings 76, 78 of the valve body 12 permit the valve to be connected to polyethylene conduit without the need for complex couplings by butt fusion or electrofusion coupling.

According to the provision of the patent statues, we have explained the principle, preferred construction, and mode of operation of our invention and have illustrated and described what we now consider to represent its best embodiments. However, it should be understood that, within the scope of the appended claims, the invention may be practiced otherwise than as specifically illustrated and described.

We claim:

1. A valve assembly comprising, a metal valve body having a pair of end fittings with at least one of said end fittings being fabricated of polyethylene to form a composite valve structure combining metal and polyethylene, said metal valve body including an annular portion, a pair of conduit portions, and a stem housing, means for connecting said conduit portions and said stem housing to said annular portion to form a unitary valve body free of fastening elements, said annular portion forming a valve chamber, said conduit portions including passageways positioned in spaced relation in said annular portion to provide a flow path between said conduit portions through said valve chamber, a valve closure member positioned in said valve chamber and sealingly connected to said conduit portions for rotation between an open position for directing flow between said conduit portions and a closed position sealing said conduit portions against flow, a valve stem extending from said closure member through said annular portion and rotatably positioned within said stem housing, an actuator connected to said valve stem above said stem housing for turning said valve stem to move said closure member between said open and closed positions, means for connecting said end fittings to said conduit portions to form a unitary valve assembly having a metal valve body and at least one polyethylene end fitting for direct connection to polyethylene conduit, a second end fitting of said pair of end fittings fabricated of metal, said polyethylene end fitting extending into gripping engagement with one of said metal conduit portions, and said metal end fitting formed integral with the other of said metal conduit portions.

2. A valve assembly as set forth in claim 1 which includes, a polyethylene conduit fused to said polyethylene end fitting, and a metal conduit welded to said metal end fitting to form a transition fitting of said polyethylene conduit to said metal conduit.

3. A valve assembly as set forth in claim 2 in which, said transition fitting permits the connection of said polyethylene conduit and said metal conduit by said valve assembly free of fasteners.

4. A valve assembly as set forth in claim 1 in which, said means for integrally connecting said end fittings to said conduit portions includes one of said pair of conduit portions having an internal gripping surface, and said polyethylene end fitting having an external diameter forming an interference fit with said conduit portion upon engagement with said internal gripping surface to compress said polyethylene end fitting into frictional engagement with said conduit portion.

5. A valve assembly as set forth in claim 4 in which, said internal gripping surface is formed by a plurality of protrusions forming grooves therebetween, said grooves engage the surface of said polyethylene end fitting to form said interference fit between said conduit portion and said polyethylene end fitting, and a plurality of O-rings retained in selected grooves along the length of said conduit portion to provide a seal around said polyethylene end fitting within said conduit portion.

6. A valve assembly as set forth in claim 1 which includes, a locking ring positioned within said polyethylene end fitting in underlying relation with said conduit portion for reinforcing the connection of said polyethylene end fitting to said conduit portion to resist pullout of said polyethylene end fitting from said conduit portion.

7. A valve assembly as set forth in claim 1 which includes, a tapered end portion on said polyethylene end fitting to facilitate insertion of said polyethylene end fitting into one of said conduit portions.

8. A valve assembly as set forth in claim 1 which includes, a fiberglass wrapping formed by extending fiberglass coated with epoxy resin around said annular portion, said conduit portions, and said stem housing, said fiberglass wrapping extending into overlying relation with a portion of said end fittings connected to said conduit portions, and an annular seal member advanced over said polyethylene end fitting into sealing engagement between said fiberglass wrapping and said polyethylene end fitting at a location where said polyethylene end fitting enters said conduit portion to form a weather seal for preventing moisture and foreign matter from entering said conduit portion around said polyethylene end fitting.

9. A valve assembly as set forth in claim 4 in which, said conduit portions each include a frustoconical section expanding from said annular portion to an enlarged diameter cylindrical end section, and said cylindrical end section of one of said conduit portions including an internal gripping surface for receiving said polyethylene end fitting in an interference fit to secure said polyethylene end fitting to said metal body portion free of couplings and fasteners.

10. A valve assembly as set forth in claim 9 in which, said polyethylene end fitting includes a tapered end portion, and said tapered end portion being advanced into frictional engagement with said conduit portion to connect said polyethylene end fitting to said metal valve body portion.

11. A valve assembly as set forth in claim 1 which includes, a fiberglass wrapping formed of fiberglass coated with epoxy resin encapsulating said annular portion and said conduit portions of said metal body portion, and said fiberglass wrapping extending into overlying relation with a portion of said polyethylene end fitting to provide a moisture resistant seal between said conduit portion and said polyethylene end fitting to protect said metal body portion against corrosion.

* * * * *